Patented Feb. 22, 1944

2,342,545

UNITED STATES PATENT OFFICE 2,342,545

VULCANIZATION OF RUBBER

Paul C. Jones, Akron, Ohio, assignor to The B. F. Goodrich Company, New York, N. Y., a corporation of New York No Drawing. Application August 10, 1938,
Serial No. 224,141

4 Claims. (Cl. 260—785)

This invention relates to the art of rubber manufacture and particularly to the vulcanization of rubber with the assistance of an accelerator. One of the principal objects of the invention is to provide a means for the rapid vulcanization of rubber at vulcanization temperatures without danger of prevulcanization or "scorching" at processing temperatures.

In recent years one of the most widely used accelerators has been mercaptobenzothiazole, in spite of a pronounced tendency to prevulcanization at the temperatures at which processing operations such as mixing, calendering, extruding and the like are carried out. Alkyl mercaptothiazoles were suggested as accelerators as early as 1922, but until recently had not been used commercially in this country.

I have found that compounds which may be characterized as carbalkoxy mercaptothiazoles or derivatives thereof, of the general formula

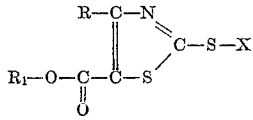

where R is hydrogen or a hydrocarbon radical, $R_1$ is a hydrocarbon radical, and X is hydrogen, a cationic salt forming group, a

group, a

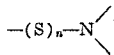

group, a

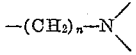

group, a —CH$_2$OH group, an acyl group, or a

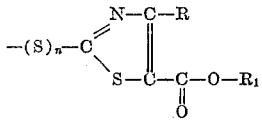

group, are excellent accelerators by means of which extremely rapid vulcanization at normal vulcanizing temperatures can be attained with greater freedom from prevulcanization than with any previously known accelerators of the mercaptothiazole class, and without sacrificing any of the desirable properties which have made mercaptothiazole accelerators so popular. In the formula above, R and $R_1$ are preferably simple alkyl radicals such as methyl, ethyl, propyl, butyl, but may be cyclic radicals such as cyclohexyl, benzyl, phenyl, tolyl, naphthyl, xenyl, or the like. X, when it is a salt-forming group, may be a metal such as sodium, potassium, calcium, magnesium, lead, zinc, mercury, etc. or a substituted ammonium radical such as dimethylammonium, dibenzylammonium, piperidinium, benzyl-hexamethylenetetrammonium or the ammonium radicals corresponding to other organic bases such as ethylene diamine, diphenyl guanidine, diamino diphenyl methane, and the like; when it is a

a

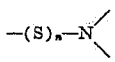

or a

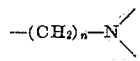

group the two free valences on the nitrogen may be occupied by hydrocarbon radicals or even by —CH$_2$— groups united to further mercaptothiazole residues; when it is an acyl group it may be either aliphatic or aromatic as in acetyl, butyryl, benzoyl, nitrobenzoyl, chlorbenzoyl, phthalyl and the like; and when it is a

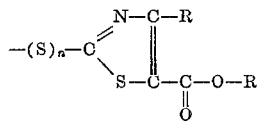

group is preferably identical with the group to which the X is attached so that the compound is a symmetrical disulfide, but corresponding trisulfides and tetrasulfides, as well as unsymmetrical polysulfides are also included. This class of accelerators of vulcanization accordingly includes such representative compounds as 2-mercapto 4-methyl 5-carbethoxy thiazole

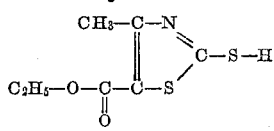

2-mercapto 4-methyl 5-carbmethoxythiazole, 2-mercapto 4-methyl 5-carbphenoxythiazole, 2-mercapto 4-phenyl 5-carbethoxythiazole and like homologues and analogues, as well as derivatives of the types set forth above, such as the salts of 2-mercapto 4-methyl 5-carbethoxythiazole with zinc, diphenylguanidine, ethylene diamine or the like, 2-dimethylaminothio 4-methyl 5-carbethoxythiazole, 2-dibenzylaminothio 4-methyl 5-carbethoxythiazole, 2-diethylaminodithio 4-methyl 5-carbethoxythiazole or the corresponding trithio, tetrathio or pentathio compounds, tris(4-methyl 5-carbethoxythiazyl-2 thiomethyl) amine

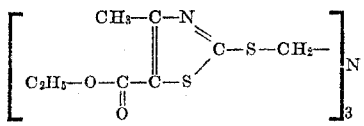

bis(4-methyl 5-carbethoxythiazyl-2 thiomethyl) butylamine, (4-methyl 5-carbethoxythiazyl-2 thiomethyl) diethylamine, 2-hydroxymethylthio 4-methyl 5-carbethoxythiazole, 2-acetylthio 4-methyl 5-carbethoxythiazole, 2-benzoylthio 4-methyl 5-carbethoxythiazole, 4-methyl 5-carbethoxythiazyl-2 disulfide or the corresponding trisulfide or tetrasulfide, or corresponding derivatives of any of the other mercaptothiazoles enumerated. These accelerators are preferably used in the usual small proportions of about 1% or less, with small proportions of sulfur, when soft rubber is to be prepared, but may be used with large proportions of sulfur to vulcanize rubber to hard rubber. The substituted thiazyl trisulfides and tetrasulfides may be used either together with sulfur, or in sufficient proportions in the neighborhood of 2 to 4% in the absence of added free sulfur, to effect vulcanization of rubber.

As a specific example of one embodiment of the invention 100 parts by weight of rubber were mixed with 52.5 parts of carbon black, 3.5 parts of zinc oxide, 4.5 parts of softeners, 1 part of antioxidant, 3 parts of sulfur and 1 part of 2-mercapto 4-methyl 5-carbethoxythiazole. After heating in a mold for 15 minutes at 240° F. the composition was still substantially unvulcanized and showed little change even when the heating was continued for 60 minutes. At 280° F. on the other hand, it was fully vulcanized after only 15 minutes, showing a tensile strength of 3800 pounds per square inch, this strength being maintained even when the heating was prolonged for ten times this period. Similar compositions containing previously known mercaptothiazoles such as mercaptobenzothiazole, when adjusted to vulcanize at 20° F. in 15 minutes, commence to vulcanize after only 30 minutes at 240° F. Alkyl mercaptothiazoles, while superior to mercaptobenzothiazole in this respect, do not show the remarkable freedom from prevulcanization shown by the accelerators of this invention. Similar results are attained by substituting other accelerators of the class set forth above, or by employing rubber compositions of a different nature from the tire tread composition set forth in this example, including among others liquid latex or rubber derived therefrom. These accelerators can be used to bring about the vulcanization of caoutchouc or of similar materials such as gutta-percha or the synthetic diene polymers which are capable of undergoing vulcanization with sulfur, all of which are embraced within the generic term "a rubber." Even better results are sometimes secured by employing these new accelerators in admixture with other types of accelerators.

I claim:

1. The method of vulcanizing a rubber which comprises heating a rubber composition containing small proportions of sulfur and of a 2-mercapto 4-alkyl 5-carbalkoxythiazole.

2. The method of vulcanizing a rubber which comprises heating a rubber composition containing small proportions of sulfur and 2-mercapto 4-methyl 5-carbethoxythiazole.

3. A vulcanized rubber composition comprising a rubber which has been vulcanized in the presence of a 2-mercapto 4-alkyl 5-carbalkoxythiazole.

4. A vulcanized rubber composition comprising a rubber which has been vulcanized in the presence of 2-mercapto 4-methyl 5-carbethoxythiazole.

PAUL C. JONES.

CERTIFICATE OF CORRECTION.

Patent No. 2,342,545.  February 22, 1944.

PAUL C. JONES.

It is hereby certified that error appears in the printed specification of the above numbered patent requiring correction as follows: Page 2, second column, line 3, for "20° F." read --230° F.--; and that the said Letters Patent should be read with this correction therein that the same may conform to the record of the case in the Patent Office.

Signed and sealed this 16th day of May, A. D. 1944.

Leslie Frazer (Seal) Acting Commissioner of Patents.